(12) United States Patent
Pérez Millán et al.

(10) Patent No.: US 11,387,622 B2
(45) Date of Patent: Jul. 12, 2022

(54) FIBER LASER SYSTEM BASED ON SOLITONIC PASSIVE MODE-LOCKING

(71) Applicant: FYLA LASER, S. L., Valencia (ES)

(72) Inventors: Pere Pérez Millán, Paterna (ES); Javier Abreu Afonso, Paterna (ES); Salvador Torres Peiró, Paterna (ES); Viorel Otgon, Paterna (ES); Héctor Muñoz Marco, Paterna (ES)

(73) Assignee: FYLA LASER, S. L., Paterna (ES)

( * ) Notice: Subject to any disclaimer, the term of this patent is extended or adjusted under 35 U.S.C. 154(b) by 242 days.

(21) Appl. No.: 16/634,970

(22) PCT Filed: Jul. 27, 2018

(86) PCT No.: PCT/IB2018/055624
§ 371 (c)(1),
(2) Date: Jan. 29, 2020

(87) PCT Pub. No.: WO2019/030601
PCT Pub. Date: Feb. 14, 2019

(65) Prior Publication Data
US 2020/0235546 A1    Jul. 23, 2020

(30) Foreign Application Priority Data

Aug. 8, 2017  (EP) .................................... 17382560

(51) Int. Cl.
*H01S 3/11*    (2006.01)
*H01S 3/00*    (2006.01)
(Continued)

(52) U.S. Cl.
CPC .......... *H01S 3/1118* (2013.01); *H01S 3/0064* (2013.01); *H01S 3/06712* (2013.01);
(Continued)

(58) Field of Classification Search
CPC .. H01S 3/1118; H01S 3/0064; H01S 3/06725; H01S 3/094003; H01S 3/09415;
(Continued)

(56) References Cited

U.S. PATENT DOCUMENTS 4,835,778 A * 5/1989 Kafka ..................... H01S 3/067
372/6
5,084,880 A * 1/1992 Esterowitz .............. H01S 3/067
372/40
(Continued)

OTHER PUBLICATIONS

Byun, "Compact, stable 1 GHz femtosecond Er-doped fiber lasers," Oct. 10, 2010, vol. 49, No. 29, pp. 5577-5582. (Year: 2010).*
(Continued)

*Primary Examiner* — Michael Carter
(74) *Attorney, Agent, or Firm* — Maier & Maier, PLLC

(57) ABSTRACT

A fiber laser system based in solitonic passive mode-locking, including a laser diode to emit and deliver an optical signal of a first wavelength; a single-fiber laser cavity including a dichroic mirror, a SESAM and a polarization maintaining highly-doped active fiber, to receive the emitted signal and to emit a pulsed optical signal of a second wavelength, generating laser light in the form of mode-locked ultrashort pulses; a unit coupling the laser diode to the single-fiber laser cavity; and an isolator device protecting the cavity from back reflections. The solitonic mode-locked ultrashort pulses are comprised in a range of 100 fs<10 ps with repetition rates of hundreds MHz to tens of GHz.

16 Claims, 4 Drawing Sheets

(51) Int. Cl.
H01S 3/067 (2006.01)
H01S 3/094 (2006.01)
H01S 3/0941 (2006.01)
H01S 3/16 (2006.01)

(52) U.S. Cl.
CPC ...... *H01S 3/06725* (2013.01); *H01S 3/09415* (2013.01); *H01S 3/094003* (2013.01); *H01S 3/1608* (2013.01); *H01S 3/1618* (2013.01); H01S 2301/085 (2013.01)

(58) Field of Classification Search
CPC .. H01S 3/1608; H01S 3/1618; H01S 3/06712; H01S 2301/085
See application file for complete search history.

(56) References Cited

U.S. PATENT DOCUMENTS

| | | | |
|---|---|---|---|
| 5,450,427 A * | 9/1995 | Fermann | H01S 3/0675 372/10 |
| 6,778,565 B2 | 8/2004 | Spuehler et al. | |
| 7,889,768 B2 | 2/2011 | Kasamatsu | |
| 8,503,492 B2 | 8/2013 | Kasamatsu et al. | |
| 8,571,075 B2 | 10/2013 | Fermann et al. | |
| 8,902,493 B2 | 12/2014 | Dong et al. | |
| 2009/0262760 A1* | 10/2009 | Krupkin | G01S 7/484 372/6 |
| 2012/0320934 A1 | 12/2012 | Yoon et al. | |

OTHER PUBLICATIONS

Hartl, "Ultra-compact dispersion compensated femtosecond fiber oscillators and amplifiers," 2005, OSA/CLEO 2005, CThG1, 3 pages. (Year: 2005).*

Cundiff, "Polarization locking in an isotropic, modelocked soliton Er/Yb fiber laser," Jul. 7, 1997, Optics Express, vol. 1, No. 1, pp. 12-20. (Year: 1997).*

International Search Report and Written Opinion of the International Searching Authority dated Nov. 14, 2018 in corresponding International application No. PCT/IB2018/055624; 15 pages.

Written Opinion of the International Preliminary Examining Authority dated Jul. 8, 2019 in corresponding International application No. PCT/IB2018/055624; 24 pages.

Byun et al., "Compact, stable 1 GHz femtosecond Er-doped fiber lasers", Optical Society of America, Oct. 10, 2010, pp. 5577-5582, vol. 49; 6 pages.

Chen et al., "3-GHz, ultrafast Yb-fiber laser sources: closing the spectral gaps", Visual Communications and Image Processing, Sep. 5, 2014, pp. 1-11, vol. 9198; 11 pages.

Martinez et al., "Multi-gigahertz repetition rate passively modelocked fiber lasers using carbon nanotubes", Optics Express, Mar. 2011, pp. 6155-6163, vol. 19; 9 pages.

Hartl et al., "Ultra-compact dispersion compensated femtosecond fiber oscillators and amplifiers", Optical Society of America, 2005, paper CThG1; 3 pages.

Nielsen et al., "Self-starting self-similar all-polarization maintaining Yb-doped fiber laser", Optics Express, Optical Society of America, Nov. 2005, pp. 9346-9351, vol. 13; 6 pages.

Nicholson et al.,"A polarization maintaining, dispersion managed, femtosecond figure-eight fiber laser," Optics Express, Optical Society of America, Sep. 2006, pp. 8160-8167, vol. 14; 8 pages.

Serafino et al., "Phase and Amplitude Stability of EHF-Band Radar Carriers Generated From an Active Mode-Locked Laser", IEEE/OSA Journal of Lightwave Technology, Dec. 2011, pp. 3551-3559, vol. 29; 9 pages.

Byun et al., "High-repetition-rate, 491 MHz, femtosecond fiber laser with low timing jitter", Optics Letters, Optical Society of America, Oct. 2008, pp. 2221-2223, vol. 33; 4 pages.

Liu et al., "Mid-IR Photothermal Imaging with a Compact Ultrafast Fiber Probe Laser", Visual Communications and Image Processing, Sep. 2014, pp. 919808-919808, vol. 9198; 6 pages.

* cited by examiner

FIBER LASER SYSTEM BASED ON SOLITONIC PASSIVE MODE-LOCKING

FIELD

The present invention is directed, in general, to laser systems. In particular, the invention relates to a fiber laser system based on solitonic passive mode-locking that can achieve pulse repetition rates of hundreds of MHz to tens of GHz and wavelength emission in the band of optical communications.

In the following, by single-fiber laser cavity it should be understood a laser cavity having a single-fiber of a single type, i.e. a single piece of optical fiber entirely composed by a single type of optical fiber. Likewise, by single-fiber of a single type it should be understood that the optical fiber is not constructed by joining, attaching, splicing, connecting or fusing together different types of optical fibers.

BACKGROUND

Pulsed optical sources with high repetition rates (tens of MHz to tens of GHz), ultrashort pulse widths (hundreds of femtosecond (fs) to tens of picoseconds (ps)) and high signal quality are being increasingly demanded in new generation optical and wireless communication networks and systems where ultrahigh-bit-rate communications are aimed, via methods and techniques such as dense wavelength division multiplexing or photonic-assisted analog to digital conversion (PADC). Some of these applications require extremely high signal quality (period relative pulse time jitters of the order of 0.01% and short-term root-mean-square pulse amplitude fluctuations of 0.1%).

On the other hand, ultra-short pulses with duration of a few picoseconds or less can only be achieved by mode-locking the laser. For this purpose, one has to establish a rigid phase relation between the many longitudinal modes which can exist in a laser cavity of a certain length.

Active Mode-Locking requires an actively driven element in the laser cavity, either modulating the amplitude (AM mode-locking) or the phase (FM mode-locking) of the propagating light. To ensure phase synchronization, the amplitude/phase must be modulated with a frequency equal to the harmonic of the mode spacing. Active mode-locking can be understood in both time and frequency domain. An amplitude modulation of a sinusoidal signal creates modulation sidebands as is well known through for example AM radio transmission. In time domain, the picture is that the modulator creates cavity losses. As the laser emits more light during loss minima, this intensity difference will accumulate during successive round trips leading to a mode-locked behavior after reaching a steady state.

In passive mode-locking, besides the ability to model dispersion, gain, losses, nonlinearities etc. in fibers, one important component is still missing to model mode-locked lasers. This is the nonlinear component used to make mode-locked lasing more favorable than continuous-wave (CW) lasing. For a laser to favor lasing mode with short pulses, an element or a combination of elements have to be present in the cavity, which introduce a higher loss at low power, so that a short pulse with higher peak power experiences a stronger net gain.

One possibility is to use a SESAM (Semiconductor Saturable Absorber Mirror) as in present invention. A SESAM consists of a Bragg-mirror on a semiconductor wafer like GaAs, incorporating materials with an intensity dependent absorption. The saturable absorber layer consists of a semiconductor material with a direct bandgap slightly lower than the photon energy. Often GaAs/AlAs is used for the Bragg mirrors and InGaAs quantum wells for the saturable absorber material. During the absorption electron-hole pairs are created in the film. As the number of photons increases, more electrons are excited, but as only a finite number of electron-hole pairs can be created, the absorption saturates. The electron-hole pairs recombine nonradiatively, and after a certain period of time they are ready to absorb photons again. Key parameters of the SESAM when designing mode-locked lasers are the recovery time, the modulation depth of absorption, the bandwidth, the saturation intensity and the non-saturable losses.

Generally, the Bragg stack can be chosen to be either anti-resonant or resonant. SESAMs based on resonant Bragg stacks can have quite large modulation depths, but with the limited bandwidth of the resonant structure. Anti-resonant SESAM's can have quite large bandwidths (>100 nm), but at the expense of a smaller modulation depth. A larger modulation depth can be obtained from an anti-resonant design at the expense of higher intrinsic losses. In solid state lasers where the single pass gain is low, the unsaturable losses of the SESAM must also remain low, but in fiber lasers where the single pass gain is much higher, unsaturable losses are less important.

The recovery time should ideally be as small as possible. Recovery times on the order of the pulse duration will cause asymmetric spectra if the pulse is chirped when it interacts with the SESAM, and hence strongly affect the pulse dynamics inside the cavity. Even larger recovery times can limit the obtainable pulse duration from the laser. This time, a fast SESAM is used.

Therefore, passively mode-locked fiber lasers have been demonstrated to be reliable, compact and cost-effective sources of femto and picosecond pulses. In addition, experimental evidences and theoretical solutions of the Nonlinear Schrödinguer Equation (NLSE) of pulse propagation inside the cavity of passively mode-locked fiber lasers demonstrate that certain solitonic solutions provide high-quality signals with extremely low phase and amplitude noise.

Typically, fiber lasers operate at low repetition rates (in the range of tens of MHz) due to their long laser cavities. However, linear Fabry-Pérot fiber cavities have shown to be an excellent solution for obtaining very-short cavities with high repetition rates [1], [2]. When integrating mode locked fiber lasers in practical applications, it is indispensable to ensure the long-term and environmental stability of the operational specifications of the laser source. In 2005, it was demonstrated that environmental instabilities can be largely eliminated by using polarization-maintaining (PM) fibers in fiber lasers [3]. So far, environmentally robust fully-PM fiber lasers passively mode-locked using different techniques have been reported in a variety of configurations [4]-[5].

Some patents or patent applications are also known in this field.

U.S. Pat. No. 8,571,075 discloses a frequency comb laser providing large comb spacing. At least one embodiment includes a mode locked waveguide laser system. The mode locked waveguide laser includes a laser cavity having a waveguide, and a dispersion control unit (DCU) in the cavity. The DCU imparts an angular dispersion, group-velocity dispersion (GVD) and a spatial chirp to a beam propagating in the cavity. The DCU is capable of producing net GVD in a range from a positive value to a negative value. In some embodiments a tunable fiber frequency comb system configured as an optical frequency synthesizer is provided. In at least one embodiment a low phase noise micro-wave source may be implemented with a fiber comb laser having a comb spacing greater than about 1 GHz. The laser system is suitable for mass-producible fiber comb sources with large comb spacing and low noise. The comb laser disclosed in this US patent is a complex fiber cavity (with free-space components) and not a single-fiber cavity.

U.S. Pat. No. 8,902,493 discloses a laser and/or an amplifier system including a doped gain fiber having ytterbium ions in a phosphosilicate glass. The embodiments described in said patent increase pump absorption to at least about 1000 dB/m-9000 dB/m. The use of these gain fibers provide for increased peak-powers and/or pulse energies. The various embodiments of the doped gain fiber having ytterbium ions in a phosphosilicate glass exhibit reduced photo-darkening levels compared to photo-darkening levels obtainable with equivalent doping levels of an ytterbium doped silica fiber. Unlike present invention the laser system of this patent does not comprise a single-fiber cavity.

Other patents disclosing other mode-locked laser systems are U.S. Pat. Nos. 6,778,565, 7,889,768 and 8,503,492. However, unlike present invention, all these mode-locked laser systems are solid-state laser systems not all-fiber laser systems.

Likewise, scientific document [1] discloses a 1 GHz thermal-damage-free femtosecond fiber laser based on highly doped anomalously dispersive erbium-doped fiber. The laser is compactly packaged in a 121 mm×94 mm×33 mm box, generates low-jitter 187 fs pulses at an output power level of 27.4 mW for 380 mW of launched pump power. Unlike present patent application, the optical fiber of the fiber laser disclosed in this scientific document does not maintain the linear polarization nor is the fiber laser based on a single highly doped Erbium/Ytterbium doped fiber: the fiber laser of this scientific document requires more than one optical fiber to obtain short and long-term stable emission.

Scientific document [7] relates to a mode-locked, femtosecond, Yb-fiber laser with a highest repetition-rate of 3 GHz. With 1-cm heavily Yb-doped phosphate glass fiber as the gain medium and a high-dispersion (−1300 fs$^2$) output coupler for dispersion compensation, the laser self-starts and produces up to 53-mW average power. With this oscillator seeding a chain of Yb-fiber amplifiers followed by a diffraction-grating based compressor, ~110-fs pulses with >12-W average power are obtained. Moreover, it is demonstrated that a combination of a high power 3-GHz Yb-fiber laser system and fiber-optic Cherenkov radiation provides new capabilities to ultrafast laser technology: generation of ~14 fs pulses with smooth spectra and broadband wavelength coverage overlapping with the Ti:sapphire lasers wavelength range. It is also demonstrated a 3 GHz, femtosecond Raman soliton source tunable from 1.15 μm to 1.35 μm. Using 30-cm photonic crystal fiber, the resulting Raman soliton pulse at 1.35 μm has 0.9 W average power. Unlike present invention, this Yb-fiber laser does not provide long-term stability. Moreover, the fibers of the Yb-fiber laser are not polarization maintaining and the anomalous dispersion is introduced by a non-fiber component (i.e. a coating) not by the fiber itself.

Scientific document [8] discloses a soliton fiber laser based on an anomalously dispersive erbium-doped fiber butt-coupled to a saturable absorber mirror for passive mode locking. The laser generates 180 fs pulses at a repetition rate of 491 MHz and exhibits a timing jitter as low as 20 fs over the frequency range 1 kHz-10 MHz. Unlike present invention, the fibers are not polarization maintaining. Therefore, this soliton fiber laser does not keep the long-term stability that is provided by maintaining the linear state of polarization of the solitonic emission regime.

Scientific document [9] relates to a mid-IR photothermal imaging system that features an integrated ultrafast erbium-doped fiber probe laser. With a mid-IR tunable quantum cascade laser (QCL) as the pump laser, vibrational molecular modes are excited and the thermally-induced changes in the refractive index are measured with a probe laser. The custom-built, all-fiber ultrafast probe laser at telecommunication wavelengths is compact, robust and thus an attractive source compared to bulky and alignment sensitive Ti:sapphire probe lasers. Thus, in this case, different to present invention, the fibers of the erbium-doped fiber probe laser are not polarization maintaining and two fibers of different type are used in the cavity (i.e. it is not a single polarization maintaining fiber system). Moreover, the management of thermal dissipation required to avoid damage of the saturable absorber (SBR in this case), an essential condition for long-term stability, is achieved using two pieces of fiber of different type. In present invention, all the conditions for obtaining long-term stability (including that of not damaging the saturable absorber) are obtained with a single piece of fiber of a single type.

US20120320934 discloses an environmentally stable optical fiber mode-locked laser generating device having an achromatic quarter wave plate. An optical fiber unit is formed of a polarization maintaining (PM) optical fiber, and a Bragg grating is formed on a first region from one end in direction to the other end, a gain material is doped on a core of a remaining second region. An optical coupling unit provides a pump laser input to one end of the optical fiber unit, and outputs a laser input from the optical fiber unit. A lens unit converts a laser output from the other end of the optical fiber unit and focuses the laser on a certain regime. A polarization control unit includes an achromatic quarter wave plate (AQWP) which is disposed between the lenses constituting the lens unit and made by laminating two quarter wave plates (QWPs) such that fast-axes of the QWPs are orthogonal to each other, and controls mode-locking of the laser and spectral bandwidth by adjusting an angle of the AQWP with respect to a fast-axis or a slow-axis of the optical fiber unit. A saturable absorbing unit absorbs and reflects the laser passed through the second lens, resulting in mode-locking. This optical fiber mode-locked laser is not a single-fiber laser nor is polarization maintaining. In fact, an external control unit is used to maintain the polarization state of the mode-locked laser and two fibers are used, one with a fiber Bragg grating (FBG) passive fiber and the other doped with a gain material.

Very short cavities in fiber lasers are really difficult to manage with, since all the elements must be perfectly integrated in very short fiber length (mirrors, passively mode-locking saturable absorbers, dispersion management components, etc.), and because the necessary gain has to be reached with a short length active medium. Moreover, the short cavities, preferably, also have to manage thermal dissipation to prevent damage of saturable absorbers and have to be robust against mechanical vibrations.

New mode-locked laser systems are therefore needed, in particular having a single-fiber laser cavity.

SUMMARY

Embodiments of the present invention provide a fiber laser system based on solitonic passive mode-locking, comprising, as common in the field, a semiconductor laser diode and a fiber laser cavity having a dichroic mirror and a semiconductor saturable absorber mirror (SESAM). The semiconductor laser diode (also referred to as pump diode) is configured to emit and deliver to the fiber laser cavity a continuous wave optical signal of a given first wavelength and power, said wavelength and power being configured to optically pump a doped active fiber of the fiber laser cavity. The fiber laser cavity is configured to receive the emitted continuous wave optical signal and to emit a pulsed optical signal of a given second wavelength generating laser light by the doped active fiber.

The dichroic mirror is located at a first end of the doped active fiber and is coated on the transversal surface of said first end. The SESAM is located at a second end of the doped active fiber, opposite to the first end. The dichroic mirror and SESAM are configured to reflect resonantly the light generated by the doped active fiber, allowing the gain of the fiber laser cavity to be higher than the losses, to obtain laser emission in the fiber laser cavity, which is generated in the form of mode-locked ultrashort pulses.

The proposed fiber laser system also comprises a unit/module/means, such as a multiplexer, e.g. a wavelength division multiplexer (WDM), configured to couple the semiconductor laser diode to the fiber laser cavity separating the continuous wave light of the semiconductor laser diode received by said unit from the pulsed light generated by the highly-doped active fiber, and an isolator device configured to protect the fiber laser cavity from back reflections.

According to the proposed fiber laser system, the medium where the light propagates inside the laser cavity is an all-fiber arrangement formed by a single fiber, i.e. it is entirely composed of a single doped active optical fiber of a single type. The single fiber is a polarization maintaining highly-doped active fiber (i.e. designed and configured to maintain a linear state of polarization of the laser light) of a single type, the properties of which are further selected to provide dispersion, nonlinear coefficient and gain required for solution of solitonic mode-locked emission. The mode-locked ultrashort pulses obtained are solitonic mode-locked ultrashort pulses comprised in a range of 100 fs<10 ps with fixed or variable repetition rates of hundreds of MHz to tens of GHz.

This proposed single fiber solution provides very high short-term stability of the pulsed emission, with period-relative time jitters below 0.024%. (see table 2).

In addition, as other previous proposals do [1, 8, 9], but only with a single fiber in the case of the present invention, this single fiber solution provides a necessary condition for long-term stability, which consists of a linearly polarized solitonic mode-locked emission. Further, unlike previous proposals, this single fiber cavity provides an original and simpler solution to the other main conditions required for long-term stability:

On the one hand, the morphology of the SESAM degrades with time by thermal effects if the optical power of laser light and/or of the pump light reaching the SESAM is above thermal damage threshold. In the few prior art where this problem is addressed [1, 9] the solution proposed relies on splicing a short piece of passive fiber, of different type to the active fiber of the cavity, to the end of the active fiber, before the SESAM. This piece of fiber dissipates the heat of the active fiber that would damage the SESAM. In the present invention, in an embodiment, in particular as designed according to equations 2 and 3, the wavelength and power of the semiconductor laser diode are such that, in combination to the absorption and emission properties of the active fiber, the optical power of the pump (i.e. the continuous wave optical signal emitted from the laser diode) and of the laser light reaching the SESAM is below the thermal damage threshold of the SESAM (see design parameters in table 1). Therefore only a single piece of fiber of a single type is required to build the laser cavity.

On the other hand, butt-coupling of the active fiber ends to the dichroic mirror and/or SESAM might leave a short free-space air gap between the coupled media that can build up optical resonances damaging the dichroic mirror and/or the SESAM. In an embodiment, present invention solves this problem by including an index matching material (i.e. a material with the same refractive index of the active fiber), on the surfaces of the dichroic mirror and/or the SESAM in contact with the active fiber end(s).

Hence, possible damaging resonances due to said air gaps in the cavity are avoided. In a particular embodiment, said index matching material is in the form of gel (e.g. the index matching gel from Thorlabs of reference G608N3, with refractive index of 1.4378 at 1550 nm). In addition, to avoid optical beam misalignment in the butt-couplings due to mechanical vibrations, the index matching gel can be solidified with UV light or heat after its inclusion to avoid the air gaps, thus adhering rigidly the dichroic mirror and/or the SESAM to the active fiber end(s) (e.g. using curable index matching gel from Norland Products of reference NOA85, with refractive index of 1.46 at 1550 nm).

Consequently, a high long-term stability is also achieved, with optical spectral power variations of 0.2 dB or below for all wavelengths within Full Width at Half Maximum (FWHM) emission bandwidth, in continuous measurements of one hour or below; and with an average output power standard deviation of 0.25% or below in continuous measurements of 48 hours or below. Further, the single-fiber cavity shows high mechanical robustness performance, as high as to bear strong hammer blows without changing its optical properties.

For example, said dispersion and nonlinear parameters could be: active fiber (AF) second-order dispersion ($\beta_2$) comprised in a range between −0.005 to −0.5·10$^{-24}$ s$^2$/m, preferably of −0.140·10$^{-24}$ s$^2$/m; cavity net dispersion value (D) comprised in a range between +0.004 to +0.4 ps/nm, preferably of +0.011 ps/nm; AF third-order dispersion ($\beta_2$) close to 0 s$^3$/m; and nonlinear coefficient ($\gamma$) comprised in a range between 1 to 10 (W·km)$^{-1}$, preferably 2.7 (W·km)$^{-1}$.

The proposed fiber laser system may further include a polarizing fiber coupler connected to a port of said unit via the isolator device and configured to provide two outputs to allow synchronous measurements of the fiber laser system. In some embodiments, an optical amplification device configured to amplify an output power of the fiber laser system can also be included.

According to a particular embodiment, said highly-doped active fiber includes an Erbium/Ytterbium-doped active fiber. For example, the Erbium/Ytterbium-doped active fiber can have a length in a range comprised between 0.5 to 20 cm, preferably of 10 cm, and an optical pump absorption in the range of hundreds of dB/m, for example 355 dB/m at a wavelength of 915 nm.

Besides, the first wavelength is comprised in a range between 912 to 918 nm, preferably 915 nm; the given power is comprised in a range between 100 to 300 mW, preferably 120 mW; and the second wavelength is comprised in a range between 1525 to 1570 nm, preferably 1535 nm.

In addition, the SESAM may have a modulation depth comprised in a range between 2 to 55%, a saturation fluence comprised in a range between 10 to 150 µJ/cm$^2$ and a recovery time comprised in a range between 0.5 to 20 ps. According to a particular embodiment, the SESAM comprises a modulation depth of 22%, a saturation fluence of 30 µJ/cm$^2$ and a recovery time of 2 ps.

In other embodiments, said highly-doped active fiber is doped with other Rare-Earth ions, such as $Er^{3+}$, $Yb^{3+}$, $Tm^{3+}$, $Ho^{3+}$, $Pr^{3+}$, among others, and combinations of them.

Embodiments of the present invention also provide, according to another aspect, a method for solitonic mode-locked generation using the system of the first aspect of the invention.

Therefore, present invention provides a short- and long-term operation, environmentally-stable fiber laser based in solitonic passive mode-locking, with pulse repetition rates in the range of hundreds of MHz to tens of GHz and wavelength emission in the band of optical communications. Such stability has been studied by a variety of measurements in the temporal and spectral—both optical and electrical—domains. As an example, pulse durations down to 2.9 ps (see FIG. 4), period-relative time jitters below 0.024%. (see Table 2), and optical spectral stability of <0.2 dB (see FIG. 6) have been obtained, for average output powers over 100 mW with a long-term stability of down to 0.25% average power standard deviation (see FIG. 8).

BRIEF DESCRIPTION OF THE DRAWINGS

The previous and other advantages and features will be more fully understood from the following detailed description of embodiments, with reference to the attached figure, which must be considered in an illustrative and non-limiting manner, in which.

DETAILED DESCRIPTION OF PREFERRED EMBODIMENTS

Figure 1:
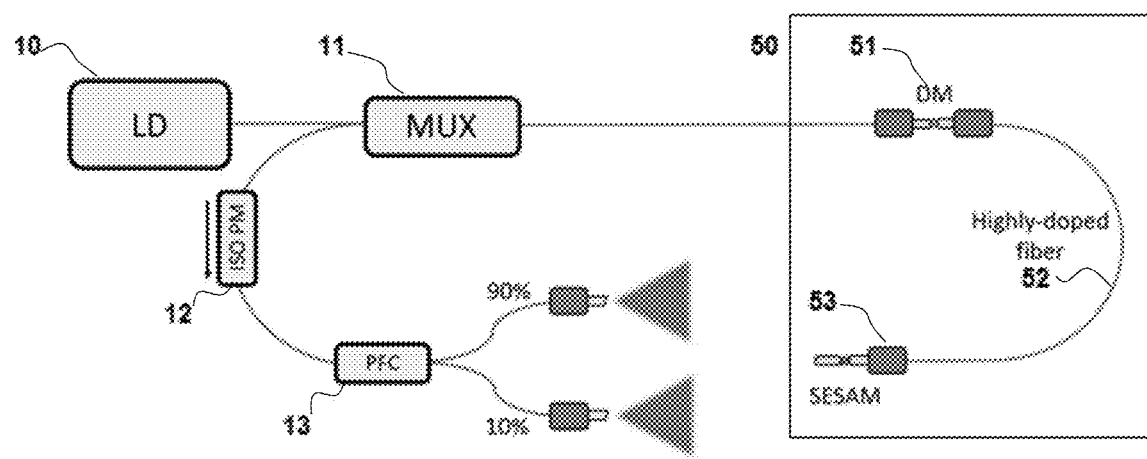
FIG. 1 is a schematic illustration of a particular embodiment of the present invention.

FIG. 1 shows a preferred embodiment of the proposed fiber laser system. According to this preferred embodiment, a semiconductor laser diode 10 emitting and delivering a continuous wave optical signal of 915 nm and approximately 120 mW is used as pump. Laser delivered from the semiconductor laser diode 10 is introduced into a fiber laser cavity 50, a single-fiber laser cavity, through a dichroic mirror 51 coated on the surface of a FC/PC connector (not illustrated for simplicity of the figure) that starts the single-fiber laser cavity 50. According to this preferred embodiment, the dichroic mirror 51 has a reflectance of ~99% at 1535 nm (second wavelength as used in the claims), and a transmittance of ~99% at 915 nm (first wavelength). The pump reaches the single-fiber laser cavity 50 through a common port of a standard multiplexer 11, in this particular case a single-mode 976/1535 nm wavelength division multiplexer (WDM), which couples the semiconductor laser diode 10 to the dichroic mirror 51. It should be noted that instead of a multiplexer, other units/modules having the same functionality, i.e. coupling the semiconductor laser diode 10 to the single-fiber laser cavity 50 separating the continuous wave light of the semiconductor laser diode 10 from the light generated by the highly-doped active fiber 52 could be also used without departing from the scope of protection of present invention.

To obtain optimum short and long-term stability of the laser emission, the proposed fiber laser system must work in solitonic pulsed regime and a linear state of polarization of the optical signal must be preserved in its propagation inside the fiber cavity and the rest of fibers. For this purpose, all optical fibers and fiber components of FIG. 1 are linear polarization maintaining (PM) fibers and linear PM fiber components.

Therefore, the medium where the light propagates inside the single-fiber laser cavity 50, which constitutes an all-fiber arrangement, is entirely composed of a single polarization maintaining highly-doped active fiber 52 of a single type. This highly-doped active fiber 52 can have a length comprised between 0.5-20 cm. According to the preferred embodiment, the highly-doped active fiber 52 comprises a 10 cm long of highly Erbium/Ytterbium-doped PM fiber (OFS EY125PM-SM-S). However, this is not limitative as in other embodiments, other highly-doped fibers with other Rare-Earth ions, such as $Er^{3+}$, $Yb^{3+}$, $Tm^{3+}$, $Ho^{3+}$, $Pr^{3+}$ among others, and combinations of them, can be used.

Moreover, in this particular preferred embodiment, a Batop InGaAs semiconductor saturable absorber mirror (SESAM) 53 with modulation depth, saturation fluence, thermal damage threshold and recovery time of 22%, 30 µJ/cm$^2$, 1 mJ/cm$^2$ and 2 ps respectively, is also placed at the end of the highly-doped active fiber FC/PC connector.

To keep a solitonic pulsed regime the net fiber dispersion of the single-fiber laser cavity 50 is anomalous, and its value is estimated to be +0.011 ps/nm from subsequent simulations.

In addition, a polarization maintaining isolator 12 is used to protect the single-fiber laser cavity 50 from back reflections that can cause instabilities and can also damage the laser. The laser output is the 1535 nm port of the multiplexer 11, which, according to this preferred embodiment, is connected to a polarizing fiber coupler (PFC) 13. This PFC 13, which is an optional element, that is, in other embodiments, not illustrated, its presence is not mandatory in order to the proposed mode-locked fiber laser to work, gives two different outputs. The signal coming out of the 90% transmission port of the PFC 13 is further amplified whereas the 10% of reference signal remains to provide an optical reference for synchronous measurements and monitoring of the laser model.

According to the present invention, the wavelength of the semiconductor laser diode 10 is, preferably, selected to be 915 nm, a wavelength at which the highly-doped Erbium/Ytterbium fiber 52 has a moderate pump absorption of 355 dB/m, therefore allowing an optimal gain regime.

The proposed laser setup of this preferred embodiment gives rise to a repetition rate of 1 GHz. However, the repetition rate can be tuned to values down to tens of MHz or up to tens of GHz by increasing or decreasing, respectively, the total length of fiber in the cavity 50 and by adapting the highly-doped active fiber 52 to the gain and dispersion necessities of the new laser.

Following, an exemplary embodiment of the numerical model used will be detailed.

In order to model numerically the emission properties of the proposed fiber laser system, pulse propagation in the single-fiber laser cavity 50 is computed solving the Nonlinear Schrödinger Equation, NLSE (eq. 1), using a standard symmetrized split-step Fourier method algorithm (SSFM):

$$\frac{\partial A}{\partial z} = (\hat{D} + \hat{N})A \quad \text{(eq. 1)}$$

Where $\hat{D}$ is the differential operator counting for dispersion and absorption in a linear medium and $\hat{N}$ is the nonlinear operator governing all nonlinear effects on pulse propagation.

This equation, crucial in a fiber transmission system, describes the propagation of the slow-varying envelope $A(z,t)$ of a single polarization of the scalar electric field of an optical pulse normal to its propagation axis. z is the spatial coordinate along the fiber. Only self-phase modulation (SPM) has been considered through the nonlinear parameter of the fiber. More complex nonlinear effects are neglected in the simulations.

The fiber laser simulation strategy consists of the propagation of the optical field envelope in consecutive round-trips. In one round-trip, the optical pulse is propagated through the different fiber sections of the linear cavity by solving equation (eq. 1) in each section, and the wavelength-dependent effects of lumped optical elements (the dichroic mirror 51 and the SESAM 53) are discretely applied. As a round-trip along the single-fiber laser cavity 50 is completed, the resulting pulse is injected into the first section of the single-fiber laser cavity 50, and a new round-trip is computed. This process is repeated, and the output is extracted after convergence, which is checked by stabilization of parameters like pulse peak power or pulse width. This convergence is generally reached in few hundreds of round-trips.

Gain in the laser is modeled after equation (70) explained by M. J. F. Digonnet in "Rare-Earth-Doped Fiber Lasers and Amplifiers", Revised and Expanded, CRC Press, New York, 2001, which accounts properly for saturation effects in the active medium. In order to extend the utility of (70) in to a more realistic scenario, a wavelength and z-position dependence of parameters in the gain equation was considered, which takes the following form:

$$g(\lambda, z) = \Gamma N_t \sigma_{em}(\lambda) \frac{\frac{P_p(z)}{P_p^{th}} \frac{\sigma_{abs}(\lambda)}{\sigma_{em}(\lambda)}}{1 + \frac{P_p(z)}{P_p^{th}}} \frac{1}{1 + \frac{P_S}{P_{sat}^*(z)}} \quad \text{(eq. 2)}$$

In equation (eq. 2), $\Gamma$ and $N_t$ are the estimated overlap factor between mode field and erbium dopant distribution, and the total ion density, respectively. Parameters $\sigma_{abs}(\lambda)$ and $\sigma_{em}(\lambda)$ represent the wavelength-dependent absorption and emission cross-sections of the highly-doped active fiber 52. PS denotes the average pulse power, calculated as $PS=E_p/T_R$, with $E_p=\int_{-\infty}^{\infty}|A(z,t)|^2 dt$ and TR is the cavity round-trip time. Psat, $P_p^{th}$ and P*sat are the intrinsic saturation power of the active medium, the pump power threshold (the pump power for which the ground and upper populations are equal) and the effective saturation power of the highly-doped active fiber 52, which are given by:

$$P_{sat} = h\nu_0 A_0 \frac{1}{\tau(\sigma_{abs}(\nu_0) + \sigma_{em}(\nu_0))} \quad \text{(eq. 3)}$$

$$P_p^{th} = \frac{h\nu_P A_P}{\sigma_{abs}(\nu_P)\tau}$$

$$P_{sat}^*(z) = P_{sat}\left(1 + \frac{P_p(z)}{P_p^{th}}\right)$$

With Pp(z) being the estimated effective pump power available after a length z of active fiber, and $\tau$ being an average fluorescence lifetime characterizing the Erbium transition. It is assumed that this effective pump power varies along the highly-doped active fiber 52 length as $Pp(z)=Pp(0)\cdot\exp(-\alpha_p z)$ with Pp(0) the pump power at the entrance of the highly-doped active fiber 52, and $\alpha_p$ a parameter that accounts for the fiber absorption at pump wavelength. Parameter h represents the Planck constant. Parameters $\nu_p$ and $\nu_0$ are the pump (central carrier) optical frequency and the laser light signal (central carrier) optical frequency, respectively. $A_p$ and $A_0$ aim for the mode effective area of the highly-doped active fiber 52 at pump (central carrier) frequency and laser light signal (central carrier) frequency, respectively.

In the numerical model, such spectral and z position dependence of the active medium gain has proven to be crucial and necessary in order to properly model numerically the emission properties of the proposed fiber laser system. When including such dependences of the active medium gain, not only calculated values of width and shape of the laser output match their corresponding experimental results with very high accuracy (in both spectral and temporal domains), but also laser threshold and laser output powers are very similar to those obtained experimentally. By contrast, not considering such dependences of the active medium gain gives rise to very unrealistic values of the laser threshold and laser output powers. Regarding the SESAM 53 effect in the numerical calculation, it was evaluated as an insertion loss dependent on the pulse intensity.

Random noise input was employed as initial seed in all the simulations. Table 1 shows the values of some of the parameters used in the simulations.

TABLE 1

Values of some of the parameters used in the simulations of the preferred embodiment of the proposed fiber laser system.

| Parameter | Value |
| --- | --- |
| Resolution in z | 0.3125 cm |
| Resolution in λ | 0.3 nm |
| Resolution in t | 31 fs |
| SESAM non-saturable losses | 15% |
| SESAM recovery time ($\tau_{SA}$) | 2 ps |
| SESAM saturation fluence | 30 μJ/cm$^2$ |
| SESAM modulation depth | 22% |
| SESAM thermal damage threshold | 1 mJ/cm$^2$ |
| Pump wavelength | 915 nm |
| Pump power | 120 mW |

TABLE 1-continued

Values of some of the parameters used in the simulations of the preferred embodiment of the proposed fiber laser system.

| Parameter | Value |
| --- | --- |
| Signal wavelength | 1535 nm |
| Active fiber (AF) length | 10 cm |
| Cavity length | 10 cm |
| AF pump absorption (at 915 nm) | 355 dB/m |
| AF second-order dispersion ($\beta_2$) | $-0.140 \cdot 10^{-24}$ s$^2$/m |
| cavity net dispersion value (D) | 0.011 ps/nm |
| AF third-order dispersion ($\beta_3$) | 0 s$^3$/m |
| AF nonlinear coefficient ($\gamma$) | 2.7 (W · km)$^{-1}$ |
| Effective area of the laser mode ($A_{\it{eff}}$) | 60.8 µm$^2$ |
| AF absorption cross section $\sigma_{abs}$ (at 1535 nm) | $1.86 \cdot 10^{-25}$ m$^2$ |
| AF emission cross section $\sigma_{em}$ (at 1535 nm) | $2.72 \cdot 10^{-25}$ m$^2$ |

Figure 2:
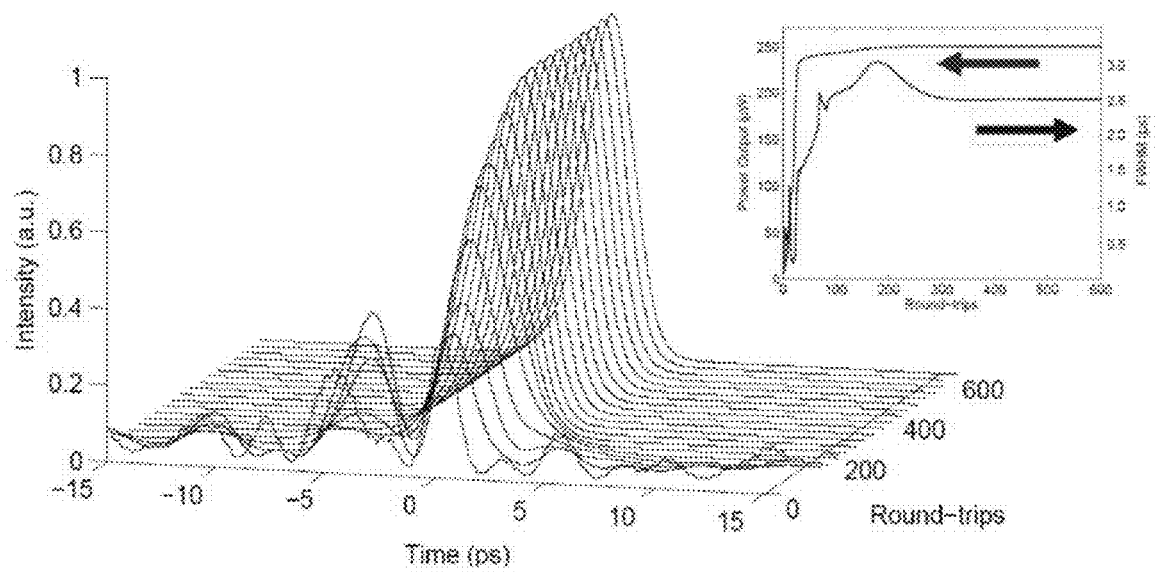
FIG. 2 is a diagram showing results obtained with the proposed fiber laser system based on solitonic passive mode-locking with a 1 GHz repetition rate.

FIG. 2 shows the simulated stable mode-locked pulse formation regime corresponding to the preferred embodiment of FIG. 1 for a 1 GHz repetition rate, calculated with equations (eq. 1) to (eq. 3) and parameters of Table 1. The inset shows the average power output and pulse FWHM evolution.

Figure 3:
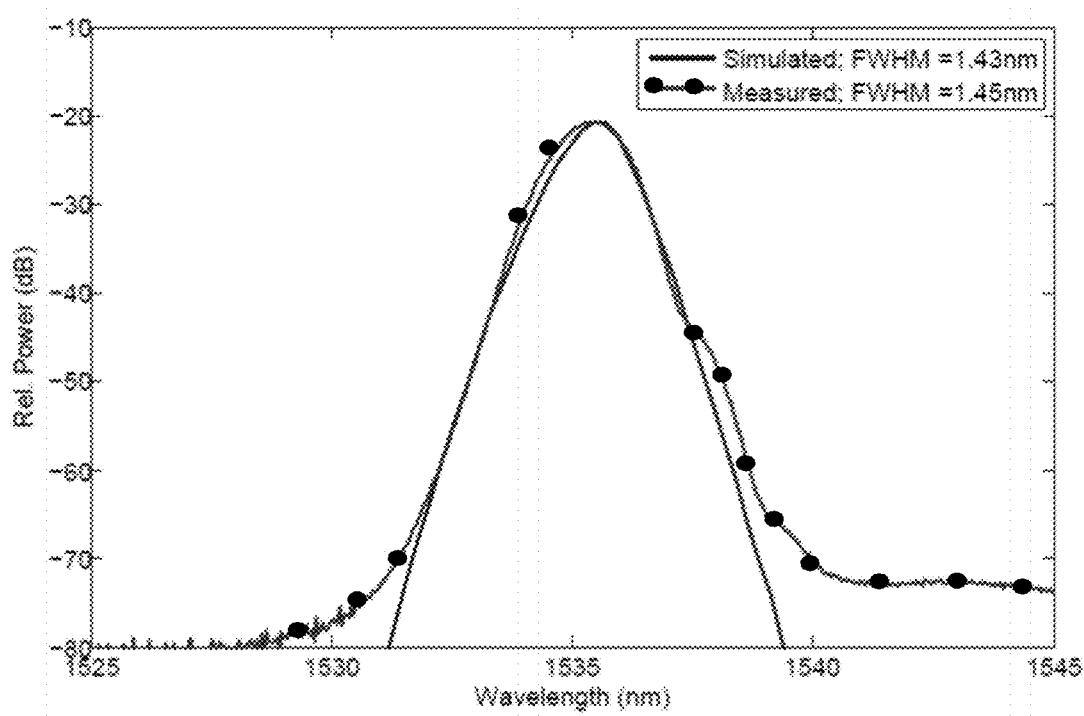
FIG. 3 is a diagram showing results obtained with the proposed fiber laser system based on solitonic passive mode-locking with a 1 GHz repetition rate.

FIG. 3 shows the comparison of the experimental and simulated output optical spectrum of the proposed fiber laser system corresponding to the preferred embodiment of FIG. 1 for a 1 GHz repetition rate, illustrating the high accuracy of the simulation method. The calculation has been performed with equations (eq. 1) to (eq. 3) and parameters of Table 1.

Figure 4:
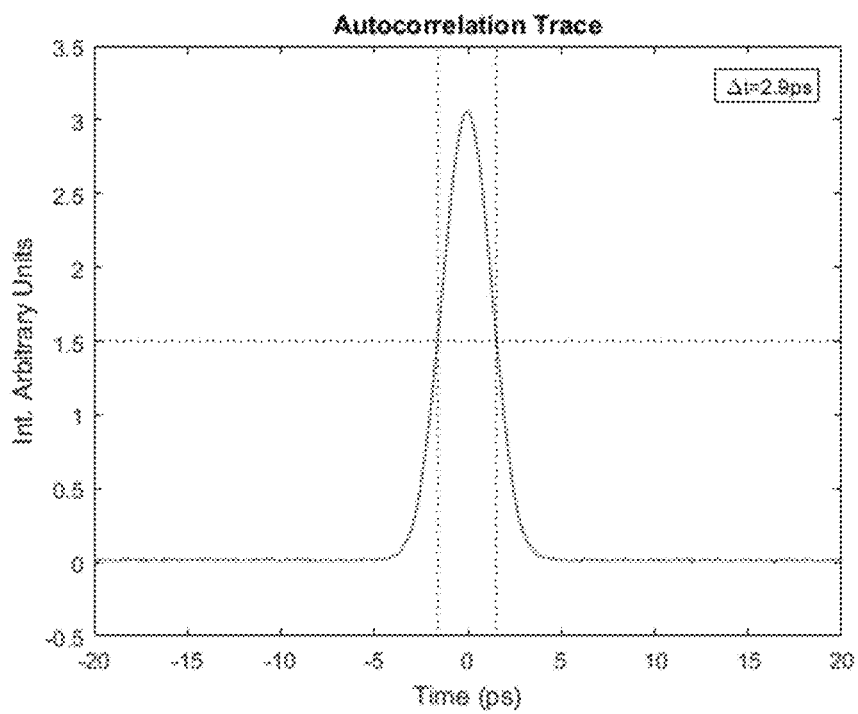
FIG. 4 is a diagram showing results obtained with the proposed fiber laser system based on solitonic passive mode-locking with a 1 GHz repetition rate.

FIG. 4 shows the experimental autocorrelation trace of the output optical pulses of the proposed fiber laser system corresponding to the preferred embodiment of FIG. 1 for a 1 GHz repetition rate.

Figure 5:
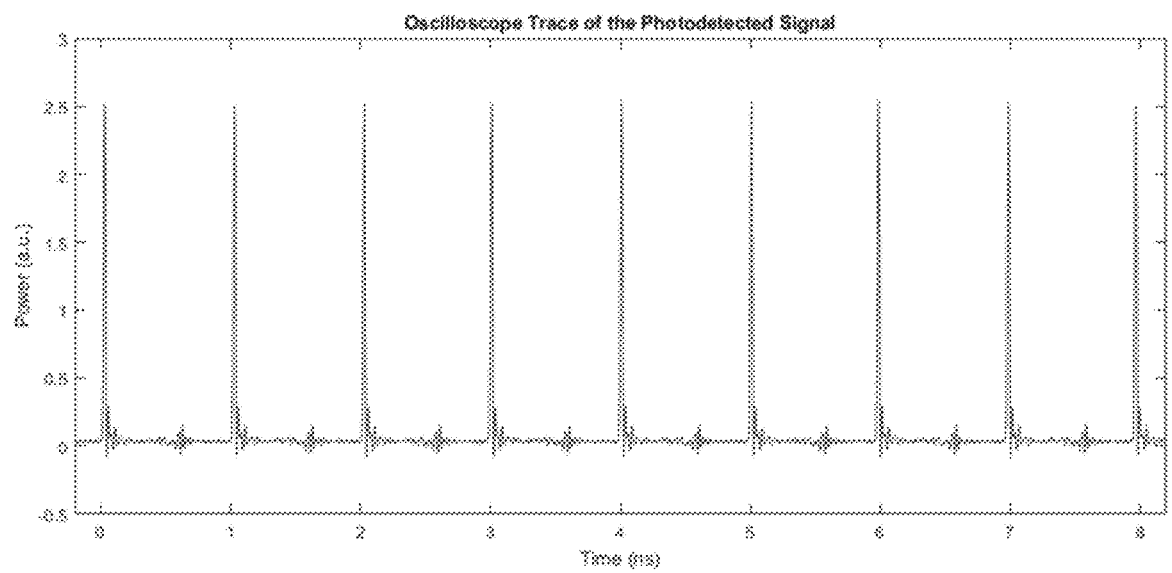
FIG. 5 is a diagram showing results obtained with the proposed fiber laser system based on solitonic passive mode-locking with a 1 GHz repetition rate.

FIG. 5 shows the experimental oscilloscope trace of the photodetected output optical signal of the proposed fiber laser system corresponding to the preferred embodiment of FIG. 1 for a 1 GHz repetition rate. A train of pulses of 1 GHz repetition rate is observed.

Figure 6:
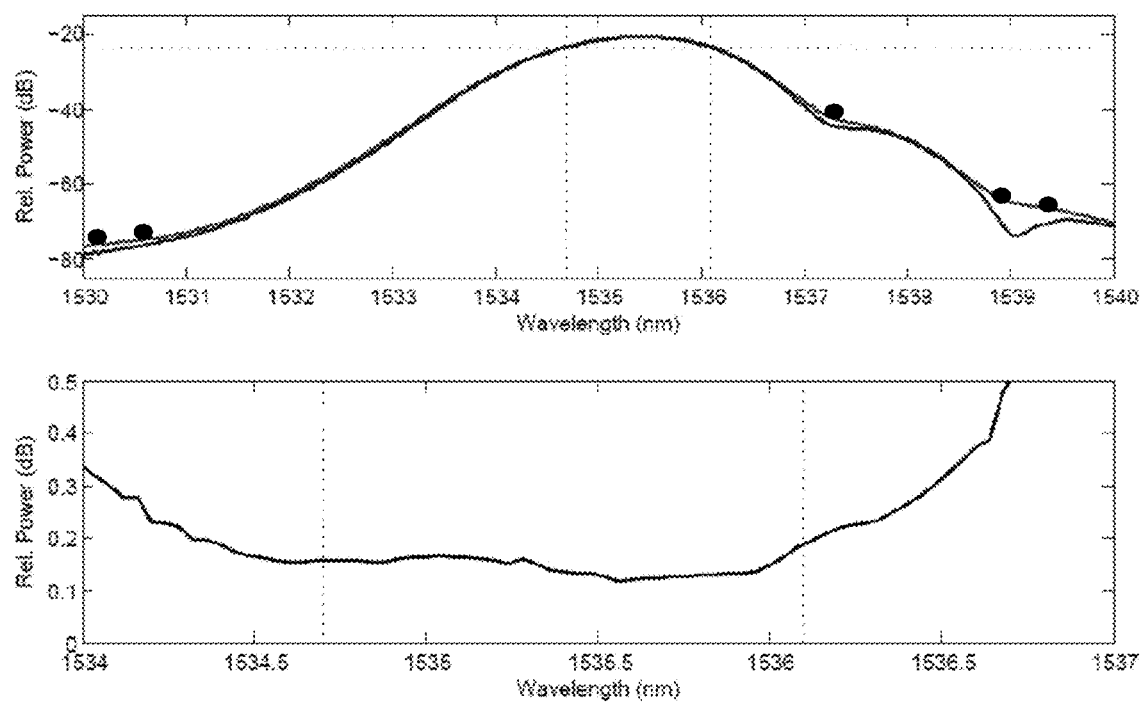
FIG. 6 is a diagram showing results obtained with the proposed fiber laser system based on solitonic passive mode-locking with a 1 GHz repetition rate.

FIG. 6 illustrates a measurement of long-term stability of the optical spectrum. Two simultaneous measures with a spectrum analyzer (Yokogawa AQ6370D Telecom Optical Spectrum Analyzer) were made: A "MAX HOLD" measure, that keeps always the maximum intensity value for each wavelength, and a "MIN HOLD" measure, that keeps always the minimum intensity value for each wavelength. These modes were kept on for 1 h long. In FIG. 6 (up) two traces are shown, the MAX HOLD (solid line with dots) and the MIN HOLD (solid line). Around the central wavelength no variations are observed. The difference between both traces is plotted in FIG. 6 (down). Less than 0.2 dB difference is measured in the FHWM range, which is close to the sensitivity provided by the optical spectrum analyzer (0.1 dB).

Figure 7:
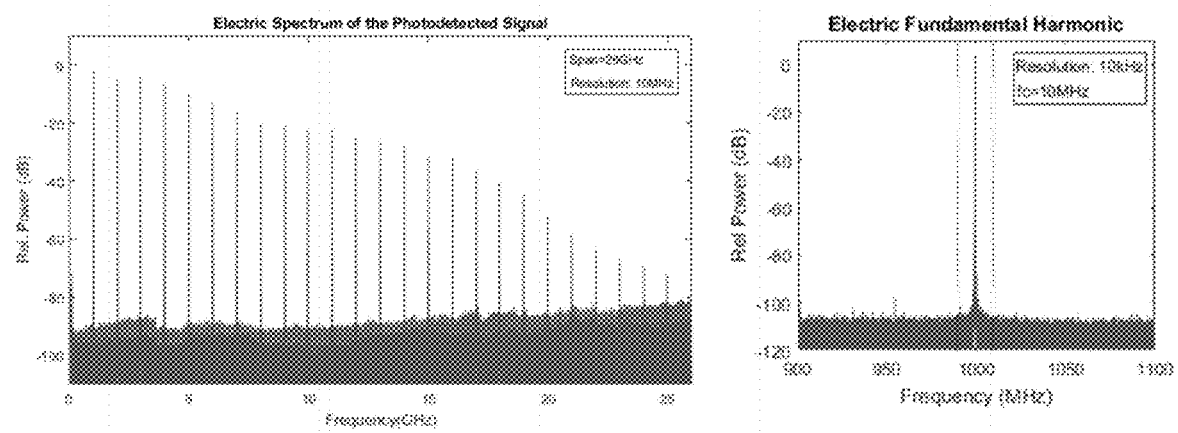
FIG. 7 is a diagram showing results obtained with the proposed fiber laser system based on solitonic passive mode-locking with a 1 GHz repetition rate.

FIG. 7 shows the experimental RF electric spectrum of the photodetected output optical signal of the proposed fiber laser system corresponding to the preferred embodiment of FIG. 1 for a 1 GHz repetition rate. The graph in the left shows a span of up to 26 GHz, showing no spurious signal in the free spectral range between consecutive harmonics of the fundamental harmonic of 1 GHz. The graph in the right shows the electrical spectrum of only the fundamental harmonic of 1 GHz, with 10 kHz resolution.

As known in the field, short-term stability in mode-locked lasers is characterized by the time jitter observed between consecutive pulses in a short period of time, typically ranging from the value of the period of the pulsed laser signal (e.g. 1 ns for a repetition rate of the pulse signal of 1 GHz) to less than one second. This time jitter is preferably calculated using the method of integration of the phase noise of the fundamental RF harmonic of the photodetected pulsed signal [6]. The results obtained with low limit integration frequency offsets $f_c$ of 1 MHz, 10 kHz and 1 kHz are shown in table 2.

TABLE 2

Values of phase noise and time jitter of the output optical signal of the proposed fiber laser system corresponding to the preferred embodiment of FIG. 1 for a 1 GHz repetition rate.

| $f_c$ | Phase Noise (dBc/Hz) | Time Jitter (fs) |
| --- | --- | --- |
| 10 MHz | <−110 | <24 |
| 10 kHz | −90 | <50 |
| 1 kHz | −70 | <670 |

Figure 8:
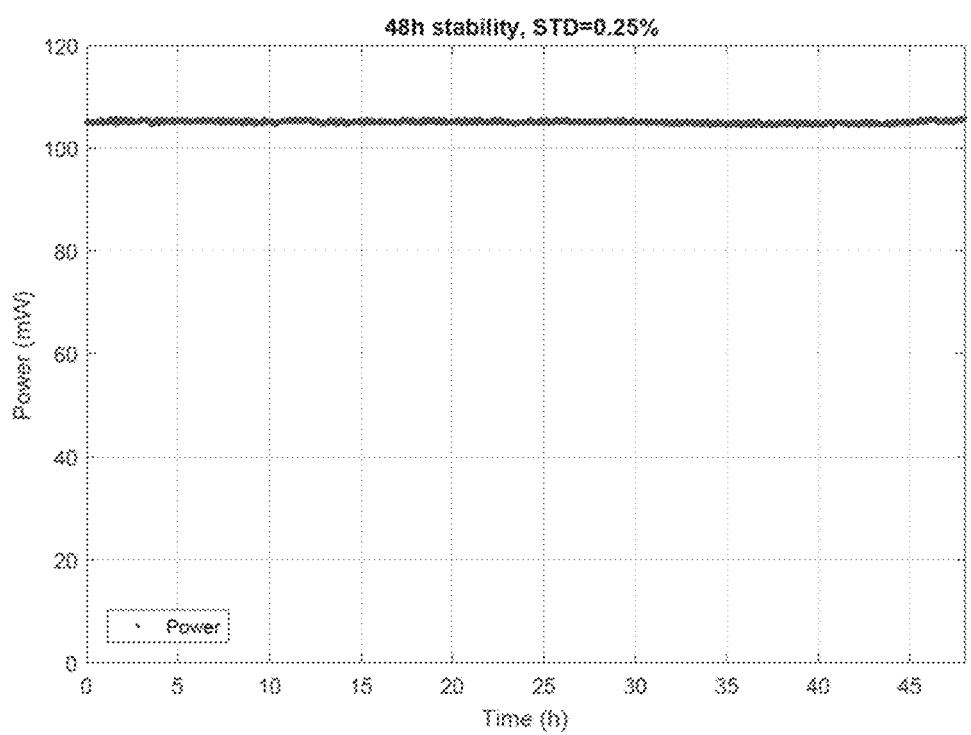
FIG. 8 is a diagram showing results obtained with the proposed fiber laser system based on solitonic passive mode-locking with a 1 GHz repetition rate.

FIG. 8 shows an example of a measurement of the long-term stability of the average optical output power of the proposed fiber laser system corresponding to the preferred embodiment of FIG. 1 for a 1 GHz repetition rate, after a further optical-fiber amplifier stage. In this particular case, a mean value of 105 mW and a standard deviation of 0.25% are obtained over at least 48 hours of operation.

Because the output power from the proposed fiber laser system illustrated in FIG. 1 can be too low for targeted applications in particular in the communications market, in some alternative embodiments of the present invention an amplification unit is also included to amplify the output power of the fiber laser system.

The scope of the present invention is defined in the following set of claims.

The invention claimed is:

1. A fiber laser system based in solitonic passive mode-locking, comprising:
   a semiconductor laser diode configured to emit and deliver to a fiber laser cavity a continuous wave optical signal of a given first wavelength and power, wherein said wavelength and power are configured to optically pump a doped active fiber of the fiber laser cavity; wherein the fiber laser cavity is configured to receive the emitted continuous wave optical signal and to emit a pulsed optical signal of a given second wavelength generating laser light by the doped active fiber, the fiber laser cavity consisting of:
   the doped active fiber,
   a dichroic mirror located at a first end of the doped active fiber, and
   a semiconductor saturable absorber mirror (SESAM) located at a second end, opposite to the first end, of the doped active fiber,
   wherein said dichroic mirror and SESAM are configured to reflect resonantly the light generated by the doped active fiber, allowing the gain of the fiber laser cavity to be higher than the losses, to obtain laser emission in the fiber laser cavity, which is generated in the form of mode-locked ultrashort pulses; and
   a unit configured to couple the semiconductor laser diode to the fiber laser cavity separating the continuous wave optical signal of the semiconductor laser diode received by the unit from the light generated by the doped active fiber;
   wherein the doped active fiber is a single fiber of a single-type and is a polarization maintaining fiber, wherein the properties of the doped active fiber are selected to provide dispersion, nonlinear coefficient, gain and state of polarization parameters required for solution of solitonic mode-locked emission, so that the fiber laser cavity yields: pulse to pulse period-relative time jitters below 0.024%, an optical spectral power variation of 0.2 dB or below for all wavelengths within Full Width at Half Maximum (FWHM) emission bandwidth in continuous measurements of one hour or below, and an average output power standard deviation of 0.25% or below in continuous measurement of 48 hours or below;

wherein the power of the continuous wave optical signal and of the laser light reaching the SESAM is below a thermal damage threshold of the SESAM;

said mode-locked ultrashort pulses are solitonic mode-locked ultrashort pulses of a pulse width between 100 fs and 10 ps with repetition rates of hundreds of MHz to tens of GHz;

and the system further comprises:
an isolator device configured to protect the fiber laser cavity from back reflections.

2. The fiber laser system of claim 1, wherein the dichroic mirror and/or the SESAM include an index matching material on their surface in contact with the active fiber end/ends.

3. The fiber laser system of claim 1, wherein the doped active fiber comprises an active fiber doped with Erbium and Ytterbium.

4. The fiber laser system of claim 3, wherein the active fiber doped with Erbium and Ytterbium has a length in a range between 0.5 to 20 cm.

5. The fiber laser system of claim 4, wherein the length of the active fiber doped with Erbium and Ytterbium is 10 cm.

6. The fiber laser system of claim 3, wherein the active fiber doped with Erbium and Ytterbium has an optical pump absorption in the range of hundreds of dB/m.

7. The fiber laser system of claim 1, wherein the first wavelength is in a range between 912 and 918 nm, the given power is in a range between 100 and 300 mW, and the second wavelength is in a range between 1525 and 1570 nm.

8. The fiber laser system of claim 1, further comprising a polarizing fiber coupler connected to a port of the unit via the isolator device and configured to provide two outputs to allow synchronous measurements of the fiber laser system.

9. The fiber laser system of claim 1, wherein the unit is a multiplexer including a wavelength division multiplexer, WDM.

10. The fiber laser system of claim 1, wherein the SESAM comprises a modulation depth in a range between 2 and 55%, a saturation fluence in a range between 10 and 150 µJ/cm$^2$ and a recovery time in a range between 0.5 and 20 ps.

11. The fiber laser system of claim 1, further comprising an optical amplification device configured to amplify an output power of the fiber laser system.

12. The fiber laser system of claim 1, wherein said dispersion parameters comprise an active fiber second-order dispersion ($\beta 2$) in a range between $-0.005 \cdot 10^{-24}$ s$^2$/m and $-0.5 \cdot 10^{-24}$ s$^2$/m, a cavity net dispersion value (D) in a range between +0.004 and +0.4 ps/nm and an active fiber third-order dispersion ($\beta 3$) close to 0 s$^3$/m; and said active fiber nonlinear coefficient ($\gamma$) in a range between 1 and 10 (W·km)$^{-1}$.

13. The fiber laser system of claim 1, wherein the doped active fiber is doped with Rare-Earth ions at least including one of Er3+, Yb3+, Tm3+, Ho3+ or Pr3+.

14. The fiber laser system of claim 1, wherein the repetition rates are fixed or variable.

15. A fiber laser system based in solitonic passive mode-locking, comprising:
a semiconductor laser diode configured to emit and deliver to a fiber laser cavity a continuous wave optical signal of a given first wavelength and power, wherein said wavelength and power are configured to optically pump a doped active fiber of the fiber laser cavity;
wherein the fiber laser cavity is configured to receive the emitted continuous wave optical signal and to emit a pulsed optical signal of a given second wavelength generating laser light by the doped active fiber, the fiber laser cavity consisting of:
the doped active fiber,
a dichroic mirror located at a first end of the doped active fiber,
a semiconductor saturable absorber mirror (SESAM) located at a second end, opposite to the first end, of the doped active fiber, and
an index matching material on the dichroic mirror's and/or the SESAM's surface in contact with the active fiber end/ends,
wherein said dichroic mirror and SESAM are configured to reflect resonantly the light generated by the doped active fiber, allowing the gain of the fiber laser cavity to be higher than the losses, to obtain laser emission in the fiber laser cavity, which is generated in the form of mode-locked ultrashort pulses; and
a unit configured to couple the semiconductor laser diode to the fiber laser cavity separating the continuous wave optical signal of the semiconductor laser diode received by the unit from the light generated by the doped active fiber;
wherein the doped active fiber is a single fiber of a single-type and is a polarization maintaining fiber,
wherein the properties of the doped active fiber are selected to provide dispersion, nonlinear coefficient, gain and state of polarization parameters required for solution of solitonic mode-locked emission, so that the fiber laser cavity yields: pulse to pulse period-relative time jitters below 0.024%, an optical spectral power variation of 0.2 dB or below for all wavelengths within Full Width at Half Maximum (FWHM) emission bandwidth in continuous measurements of one hour or below, and an average output power standard deviation of 0.25% or below in continuous measurement of 48 hours or below;
wherein the power of the continuous wave optical signal and of the laser light reaching the SESAM is below a thermal damage threshold of the SESAM;
said mode-locked ultrashort pulses are solitonic mode-locked ultrashort pulses of a pulse width between 100 fs and 10 ps with repetition rates of hundreds of MHz to tens of GHz;
and the system further comprises:
an isolator device configured to protect the fiber laser cavity from back reflections.

16. A fiber laser system based in solitonic passive mode-locking, comprising:
a semiconductor laser diode configured to emit and deliver to a fiber laser cavity a continuous wave optical signal of a given first wavelength and power, wherein said wavelength and power are configured to optically pump a doped active fiber of the fiber laser cavity;
wherein the fiber laser cavity is configured to receive the emitted continuous wave optical signal and to emit a pulsed optical signal of a given second wavelength generating laser light by the doped active fiber, the fiber laser cavity comprising:

the doped active fiber, a dichroic mirror located at a first end of the doped active fiber, and a semiconductor saturable absorber mirror (SESAM) located at a second end, opposite to the first end, of the doped active fiber, wherein said dichroic mirror and SESAM are configured to reflect resonantly the light generated by the doped active fiber, allowing the gain of the fiber laser cavity to be higher than the losses, to obtain laser emission in the fiber laser cavity, which is generated in the form of mode-locked ultrashort pulses; and a unit configured to couple the semiconductor laser diode to the fiber laser cavity separating the continuous wave optical signal of the semiconductor laser diode received by the unit from the light generated by the doped active fiber;

wherein the light propagates inside the laser cavity through an all-fiber arrangement formed by a single fiber that is not constructed by joining, attaching, splicing, connecting or fusing together different types of optical fibers, the all-fiber arrangement being entirely composed of said doped active fiber which is the single fiber of a single-type and is a polarization maintaining fiber, wherein the properties of the doped active fiber are selected to provide dispersion, nonlinear coefficient, gain and state of polarization parameters required for solution of solitonic mode-locked emission, so that the fiber laser cavity yields: pulse to pulse period-relative time jitters below 0.024%, an optical spectral power variation of 0.2 dB or below for all wavelengths within Full Width at Half Maximum (FWHM) emission bandwidth in continuous measurements of one hour or below, and an average output power standard deviation of 0.25% or below in continuous measurement of 48 hours or below;

wherein the power of the continuous wave optical signal and of the laser light reaching the SESAM is below a thermal damage threshold of the SESAM;

said mode-locked ultrashort pulses are solitonic mode-locked ultrashort pulses of a pulse width between 100 fs and 10 ps with repetition rates of hundreds of MHz to tens of GHz;

and the system further comprises:

an isolator device configured to protect the fiber laser cavity from back reflections.

* * * * *